No. 718,398. PATENTED JAN. 13, 1903.
G. STAEHLE.
WORM GEAR.
APPLICATION FILED AUG. 2, 1902.
NO MODEL.

WITNESSES:
Conrad Zimmer
Henry J. Suhrbier

INVENTOR
Gustav Staehle
BY Jocquex Niles
ATTORNEYS.

UNITED STATES PATENT OFFICE.

GUSTAV STAEHLE, OF STUTTGART, GERMANY.

WORM-GEAR.

SPECIFICATION forming part of Letters Patent No. 718,398, dated January 13, 1903.

Application filed August 2, 1902. Serial No. 118,099. (No model.)

*To all whom it may concern:*

Be it known that I, GUSTAV STAEHLE, a citizen of the Empire of Germany, residing in Stuttgart, Germany, have invented certain new and useful Improvements in Worm-Gears, of which the following is a specification.

The worm-gear though well adapted for transmission of power on a large scale is but little employed in such cases, as there is a considerable loss of power by the great friction that takes place between the parts of the same. Attempts were therefore made to provide worms and worm-gears with antifriction-rollers, so as to obviate the loss of power by friction in worm-gear transmissions; but the arrangement of the roller-bearings in worm gear-wheels did not meet the requirements of practical use, so that their use was limited to few applications. The support of the rollers in the worm-gears was objectionable on account of the one-sided action on the pivot-shafts and on rollers, by which bending or breaking of the pivots and interruption in the running of the worm-gear were caused.

My improved worm-gear is designed to overcome the defects referred to and to furnish a very reliable and effective gear for all applications; and for this purpose the invention consists of a worm-gear in which the worm gear-wheel is provided with antifriction-rollers in place of teeth, the shafts of the rollers being supported at both ends; and the invention consists, further, of a worm gear-wheel provided with antifriction-rollers the shafts of which are supported at both ends by means of outwardly-projecting offset lugs connected by transverse bridge-pieces, said lugs and bridge-pieces having inclined side faces, so that in case of breakage of one of the shafts said lugs can take the place and act in the nature of teeth without interrupting the working of the worm-gear.

Figure 1:
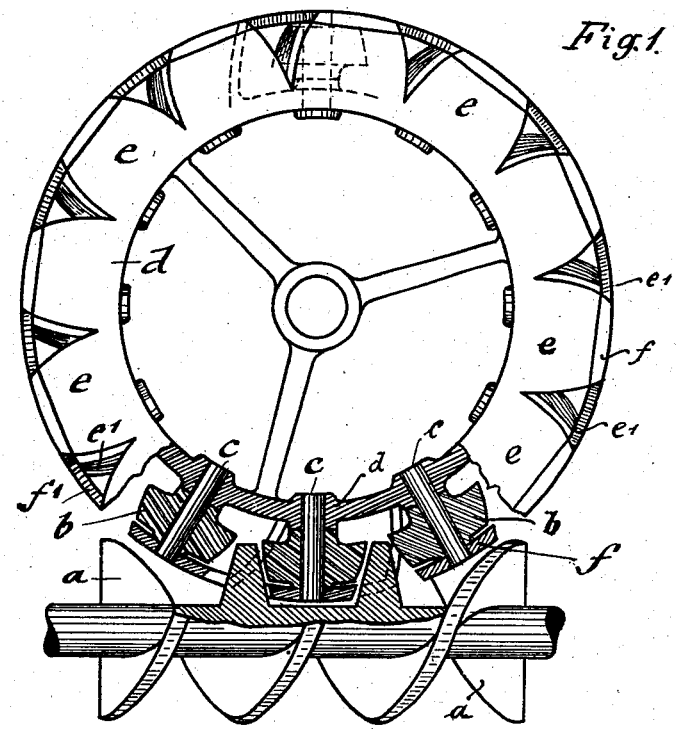
Figure 2:
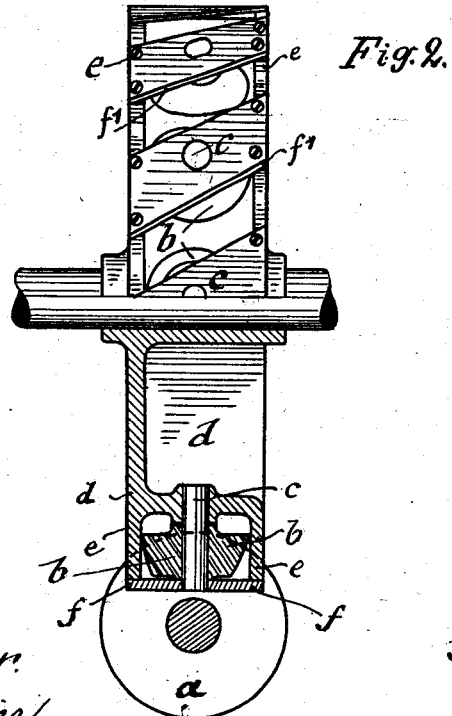

In the accompanying drawings, Figure 1 is a side elevation, partly in section, and Fig. 2 an end elevation, also partly in section, of my improved worm-gear.

Similar letters of reference indicate corresponding parts.

The worm $a$ is of the usual construction, with smooth convolutions. The worm gear-wheel $d$ is not provided with teeth; but in place of the same antifriction-rollers $b$ are substituted, which are supported on shafts $c$, that are arranged radially on the circumference of the worm gear-wheel $d$. These shafts $c$, however, are not only supported at their inner ends in the circumference of the worm gear-wheel $d$, but also at their outer ends in transverse bridge-pieces $f$ of outwardly-extending lugs $e$, which are preferably made integral with the circumference of the gear-wheel $d$. The outwardly-extending lugs $e$ at opposite sides of the circumference of the gear-wheel $d$ extend radially from the circumference and are offset toward each other in such a manner that the lugs in one side of the wheel are in advance of those on the other side, so that the inclination of their side faces $e'$ and the inclination of the side faces $f'$ of the transverse bridge-pieces $f$ correspond to the screw-pitch of the worm $a$. The interstices between the adjacent lugs $e$ and the transverse bridge-pieces $f$ are so arranged that the convolutions of the worm can move freely within the same. This arrangement has the further advantage that in case of the breakage of one of the roller-shafts $c$ the worm-gear is not placed out of use and the transmission of motion interrupted, for the reason that the faces $e'$ and $f'$ of the outwardly-extending lugs $e$ and transverse bridge-pieces $f$, respectively, take the place of the roller and act in the nature of teeth, so that the motion of the worm-gear can be kept up until a new roller-shaft $c$ can be substituted for the broken shaft. It is necessary that some of the bridge-pieces for the roller-shafts should be made independently of and detachably from the gear-wheel, while the remaining ones can be made integral therewith. In this case, however, the rollers have to be introduced at the points where the separable bridge-pieces are located and have then to be passed gradually from one pair of lugs to the other until they can be held in position by the insertion of the roller-shafts through the hubs of the rollers, said shafts being then fastened by being secured in their bearings in the circumference of the wheel and the bridge-pieces of the outwardly-extending lugs.

Having thus described my invention, I claim as new and desire to secure by Letters Patent—

In a worm-gear, the combination with a driving screw or worm, of a worm gear-wheel provided at its circumference with outward radially-extending lugs set off at opposite sides of said circumference so that the lugs on one side of the wheel are in advance of those on the other, bridge-pieces connecting the ends of the offset lugs, radial shafts supported between the lugs by the circumference of the worm gear-wheel and the bridge-pieces, and antifriction-rollers on said shaft, substantially as set forth.

In testimony that I claim the foregoing as my invention I have signed my name in presence of two subscribing witnesses.

GUSTAV STAEHLE.

Witnesses:
CONRAD ZEISIG,
ERNST CUTENMAN.